(12) United States Patent
Fu et al.

(10) Patent No.: US 11,991,636 B2
(45) Date of Patent: May 21, 2024

(54) APPARATUS AND A METHOD FOR DETERMINING ACTIVATION STATE OF SECONDARY CELL AND USER EQUIPMENT IN WIRELESS COMMUNICATION SYSTEM

(71) Applicant: Samsung Electronics Co., Ltd., Gyeonggi-do (KR)

(72) Inventors: Jingxing Fu, Beijing (CN); Bin Yu, Beijing (CN); Chen Qian, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 548 days.

(21) Appl. No.: 17/279,454

(22) PCT Filed: Sep. 27, 2019

(86) PCT No.: PCT/KR2019/012660
§ 371 (c)(1),
(2) Date: Mar. 24, 2021

(87) PCT Pub. No.: WO2020/067811
PCT Pub. Date: Apr. 2, 2020

(65) Prior Publication Data
US 2022/0039015 A1     Feb. 3, 2022

(30) Foreign Application Priority Data

Sep. 27, 2018  (CN) .......................... 201811133785.4
Apr. 2, 2019   (CN) .......................... 201910262503.9

(51) Int. Cl.
*H04W 52/02*   (2009.01)
*H04W 72/1273* (2023.01)
*H04W 72/23*   (2023.01)

(52) U.S. Cl.
CPC ... *H04W 52/0235* (2013.01); *H04W 52/0216* (2013.01); *H04W 72/1273* (2013.01); *H04W 72/23* (2023.01)

(58) Field of Classification Search
CPC ......... H04W 52/0235; H04W 52/0216; H04W 72/23; H04W 72/1273
(Continued)

(56) References Cited

U.S. PATENT DOCUMENTS 10,952,200 B2    3/2021  Ren et al.
2016/0226637 A1*  8/2016  Nory ................ H04W 72/0453
(Continued)

FOREIGN PATENT DOCUMENTS

KR  1020170106313  9/2017
WO  WO 2018/059529  4/2018
WO  WO2018127178   7/2018

OTHER PUBLICATIONS

3GPP TSG-RAN WG2 #100 R2-1713170 Nov. 2017.*
(Continued)

*Primary Examiner* — William Nealon
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The embodiment of the application provides a method for determining the activation state of a secondary cell and a UE. The method is applied to the technical field of wireless communication and comprises the following steps: acquiring secondary cell activation state indicator information, and then determining respective corresponding states of at least one secondary cell configured or reconfigured by a UE based on
(Continued)

the secondary cell activation state indicator information, wherein the states include: an activation state and an inactivation state. The embodiment of the application realizes the reduction of the time delay for the user equipment to receive or send data and the reduction of the time required for deactivating a secondary cell, thereby reducing the power consumption of the UE.

18 Claims, 8 Drawing Sheets

(58) Field of Classification Search
USPC .......................................................... 370/318
See application file for complete search history.

(56) References Cited

U.S. PATENT DOCUMENTS

| | | | |
|---|---|---|---|
| 2016/0338139 A1* | 11/2016 | Kwon | H04W 76/27 |
| 2017/0086172 A1* | 3/2017 | Dinan | H04L 5/0048 |
| 2018/0007731 A1 | 1/2018 | Park et al. | |
| 2018/0077643 A1* | 3/2018 | Dinan | H04W 72/21 |
| 2018/0131426 A1 | 5/2018 | Lee et al. | |
| 2018/0206214 A1* | 7/2018 | Bendlin | H04L 5/0053 |
| 2018/0269939 A1 | 9/2018 | Hu et al. | |
| 2019/0312702 A1 | 10/2019 | Yan et al. | |

OTHER PUBLICATIONS

PCT/ISA/210 Search Report issued on PCT/KR2019/012660, Jan. 15, 2020, pp. 3.
PCT/ISA/237 Written Opinion issued on PCT/KR2019/012660, Jan. 15, 2020, pp. 7.
ETSI TS 138 321 V15.2.0 (Sep. 2018), 5G; NR; Medium Access Control (MAC) protocol specification, pp. 74.
ITL Inc., "The Small Cell On/Off State Indication by DCI Format", R1-142529, 3GPP TSG RAN WG1 Meeting #77, May 19-23, 2014, 4 pages.
Nokia (Rapporteur), "Report of [99bis#32][LTE/euCA] Faster Activation for Scells (Nokia)", R2-1713170, 3GPP TSG-RAN WG2 #100, Nov. 27-Dec. 1, 2017, 8 pages.
European Search Report dated Nov. 12, 2021 issued in counterpart application No. 19864339.7-1212, 12 pages.
European Search Report dated Aug. 4, 2023 issued in counterpart application No. 19864339.7-1216, 6 pages.

* cited by examiner

[Fig. 1]
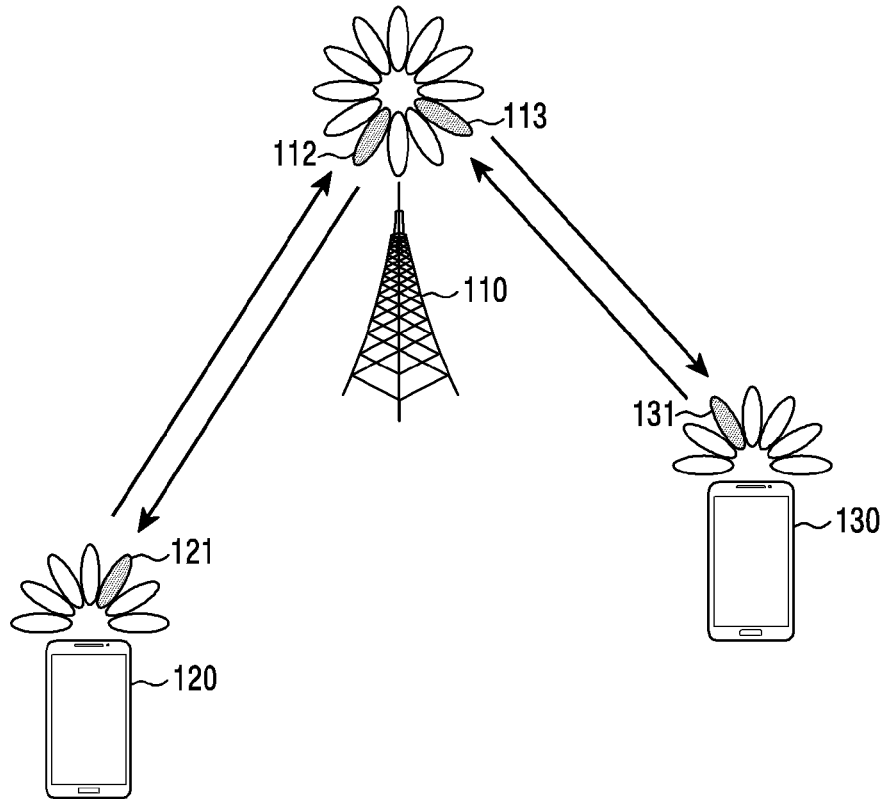
[Fig. 2]
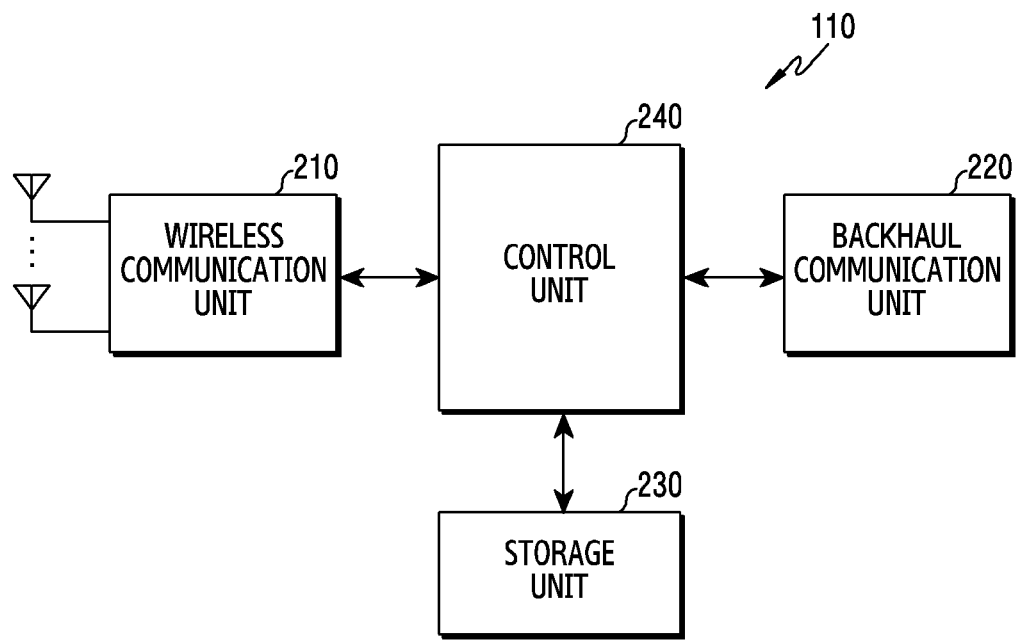

[Fig. 3]
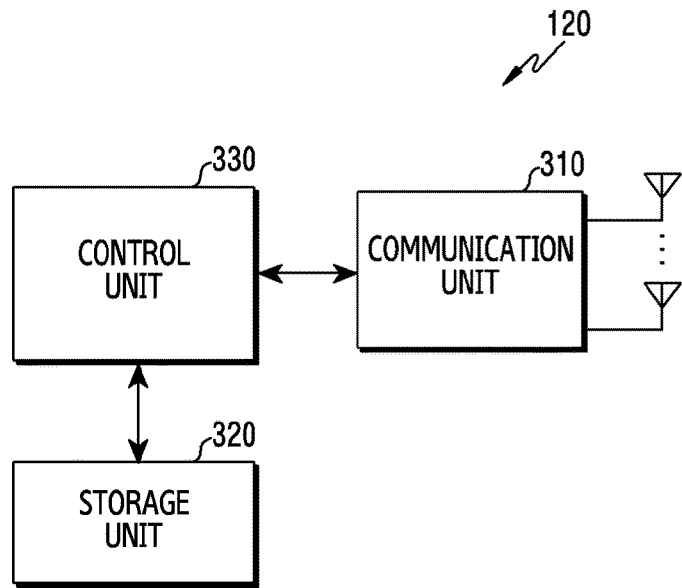
[Fig. 4]
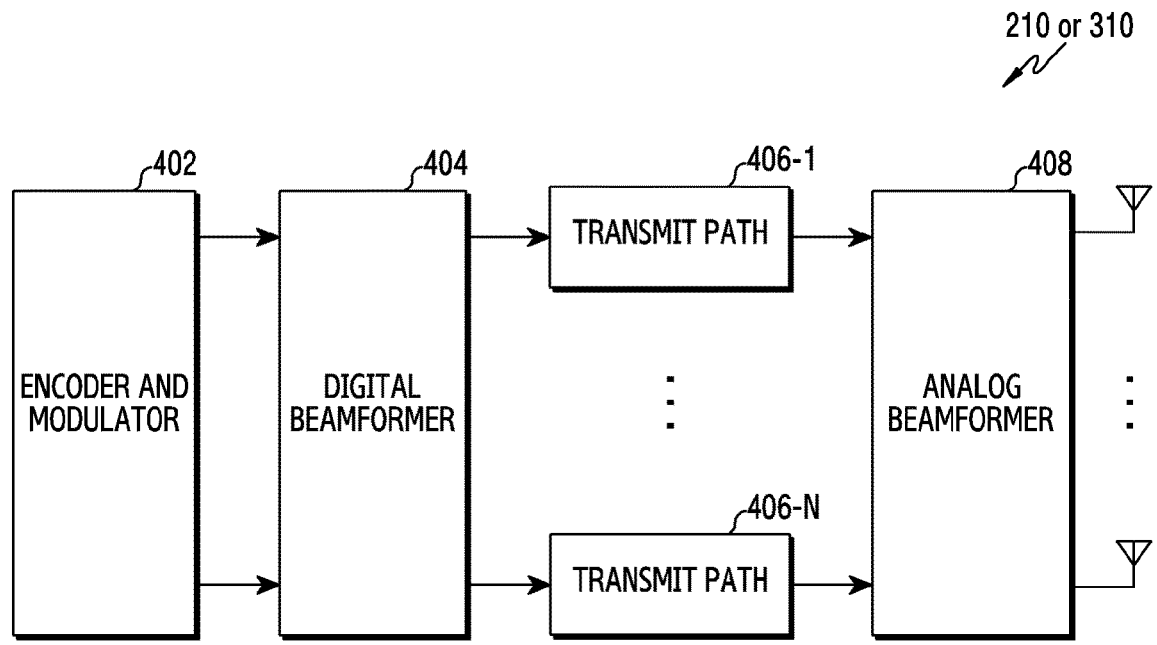

[Fig. 5]
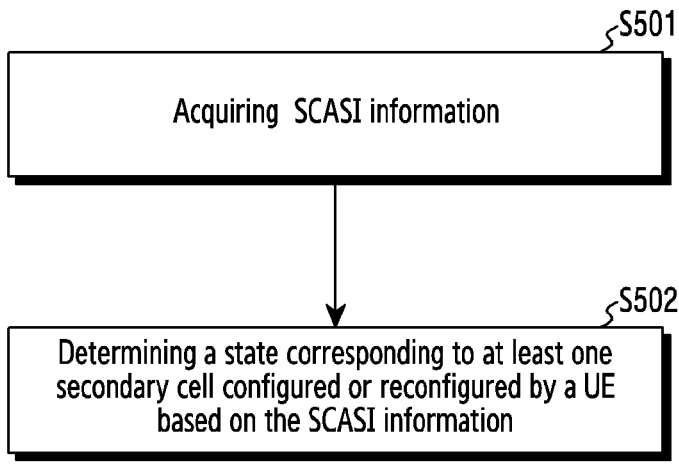
[Fig. 6]
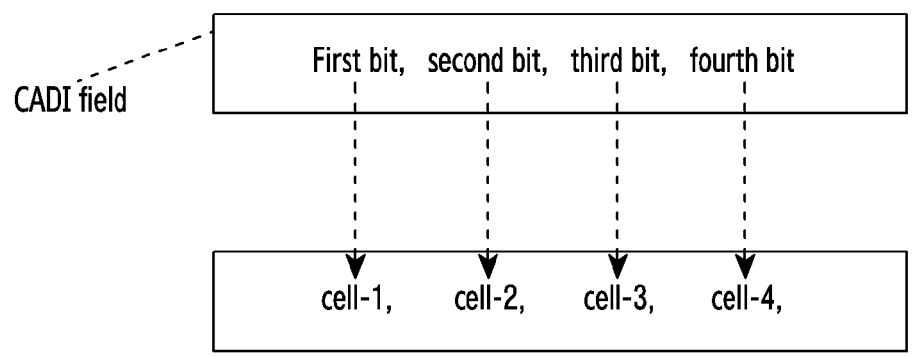
[Fig. 7]
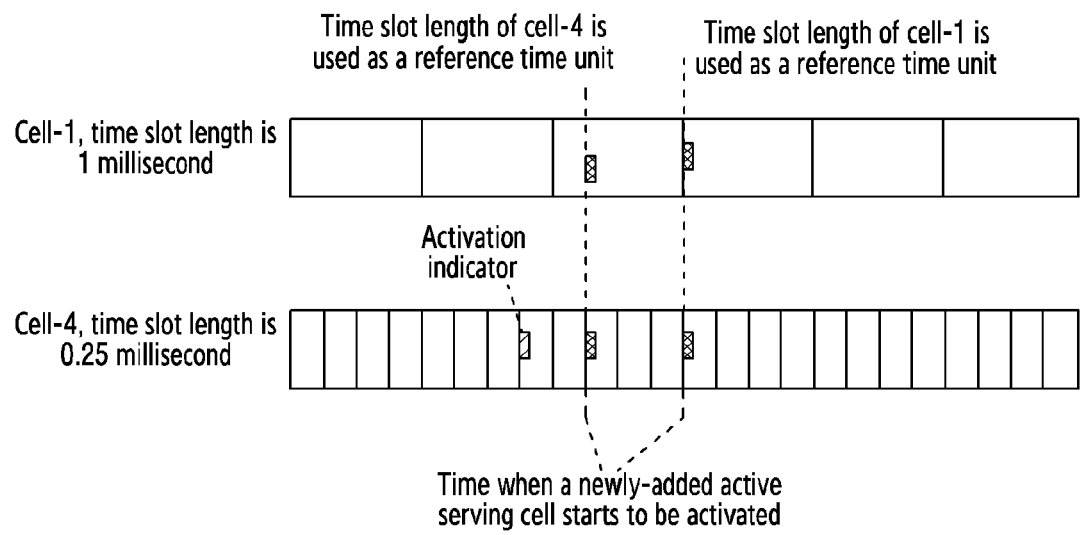

[Fig. 8]
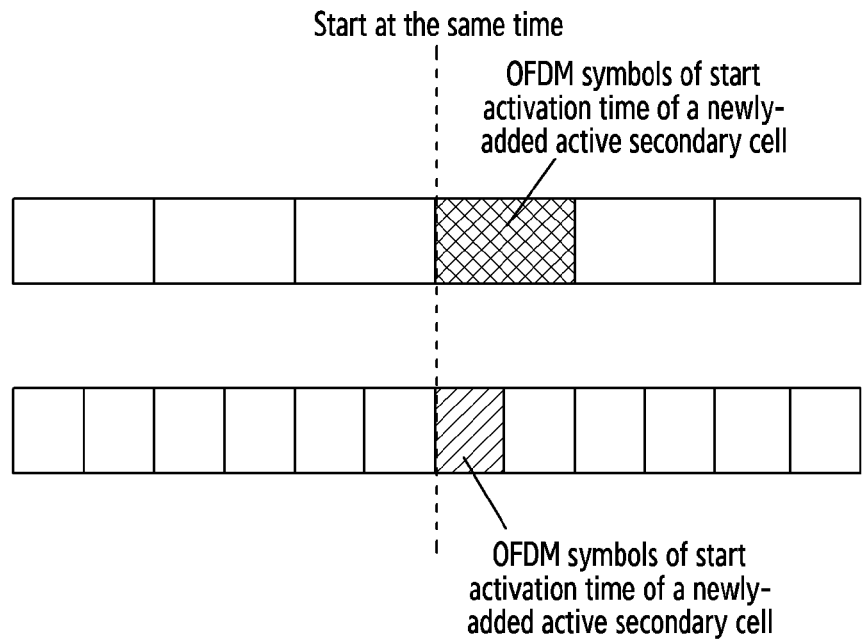
[Fig. 9]
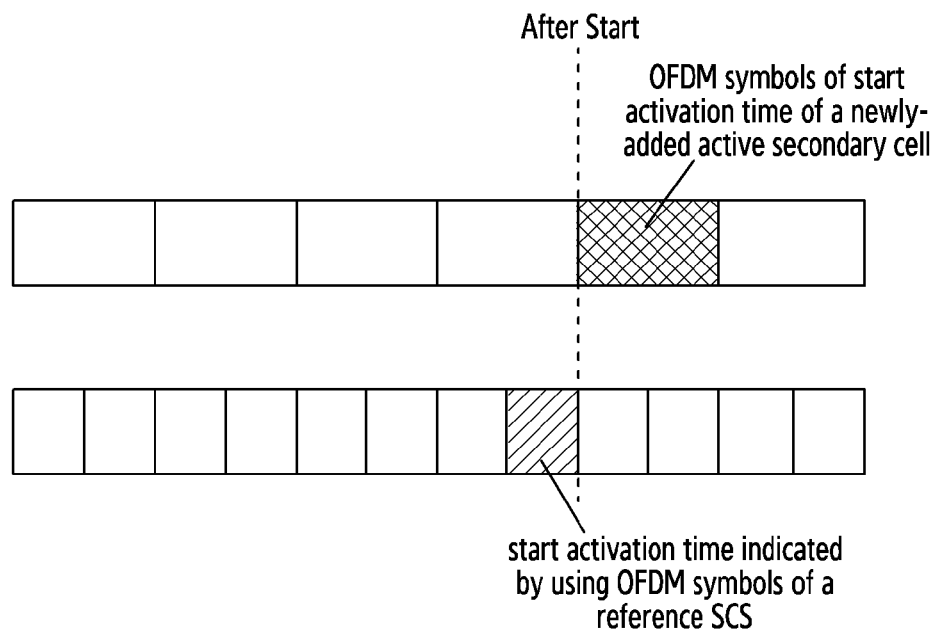

[Fig. 10]
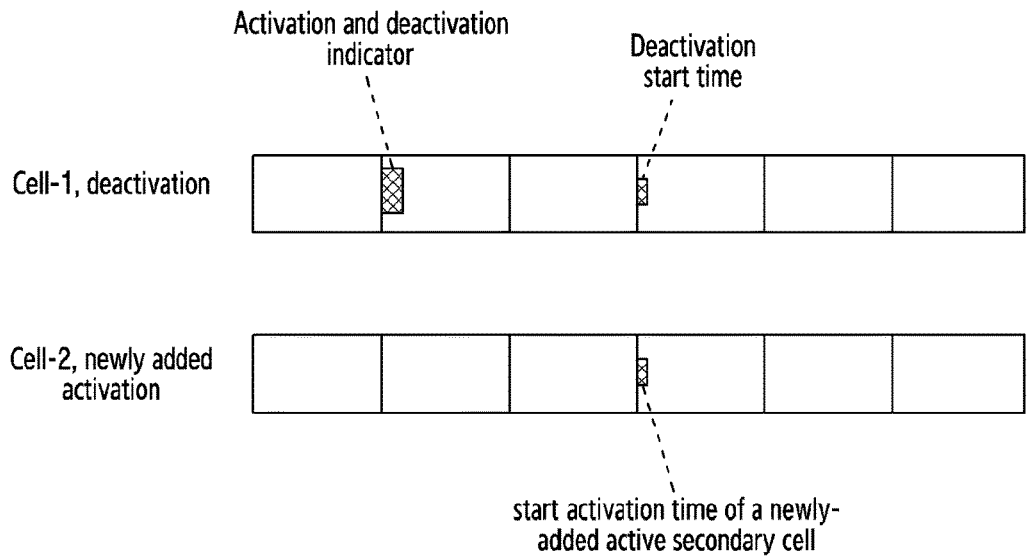
[Fig. 11]
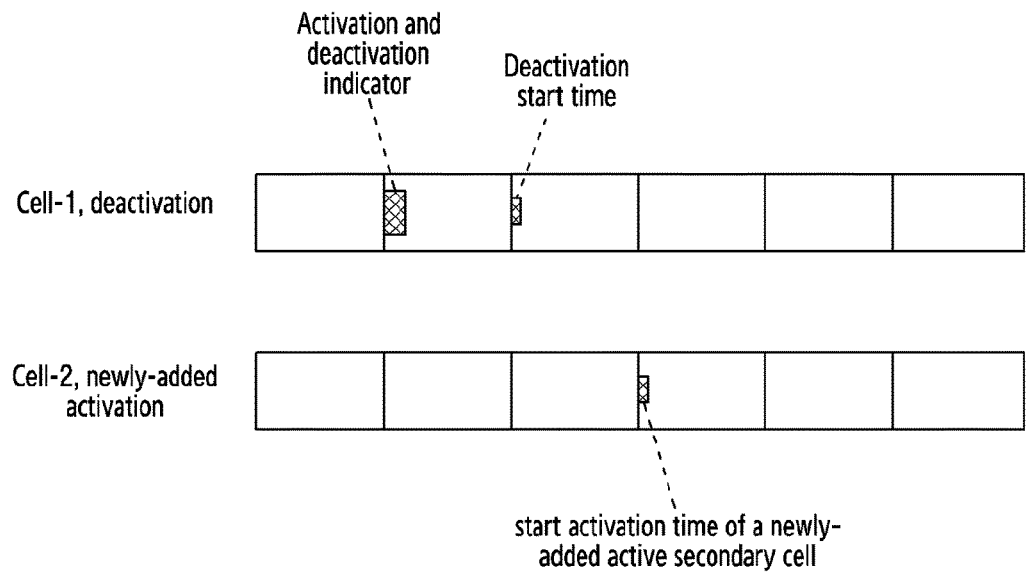
[Fig. 12]
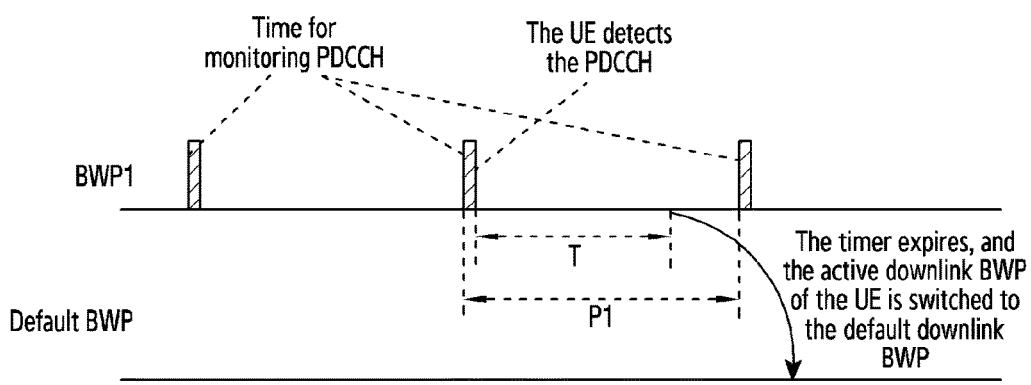

[Fig. 13]
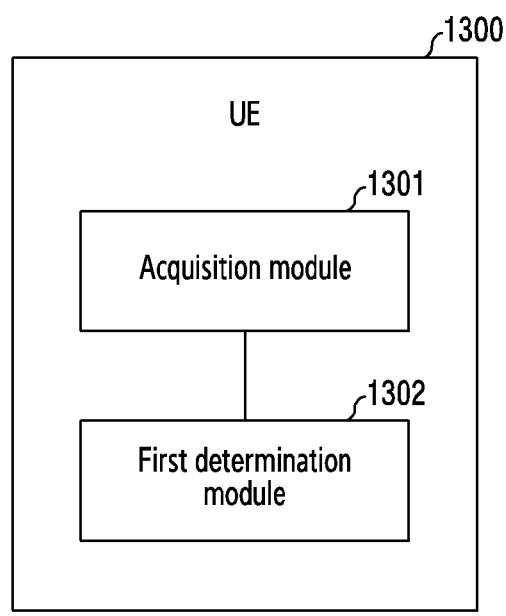

[Fig. 14]
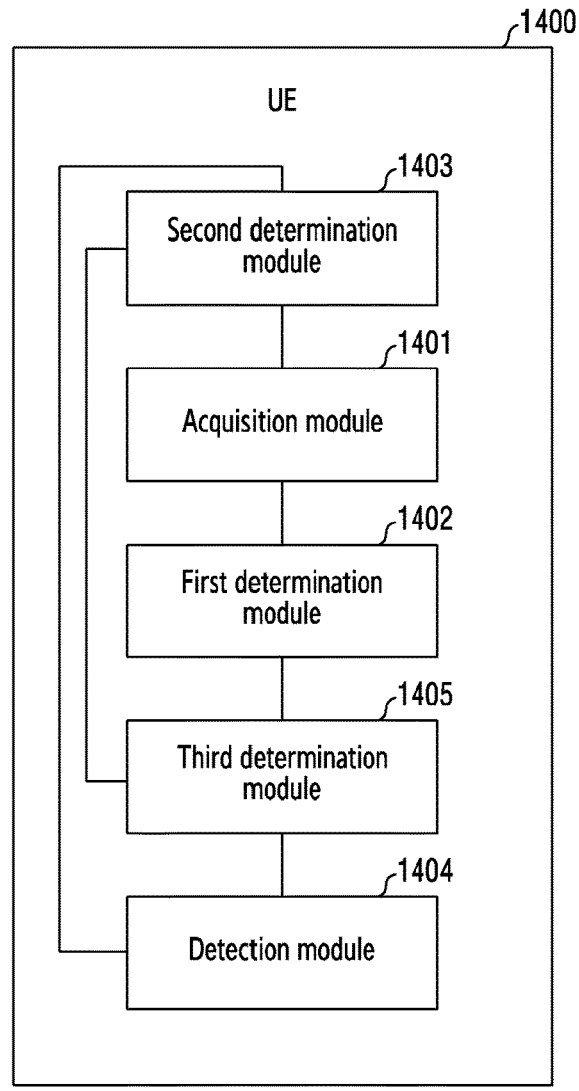
[Fig. 15]
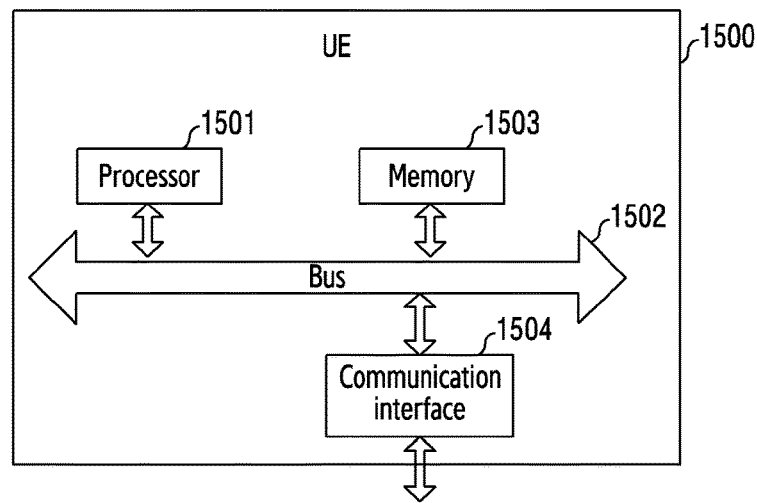

[Fig. 16]
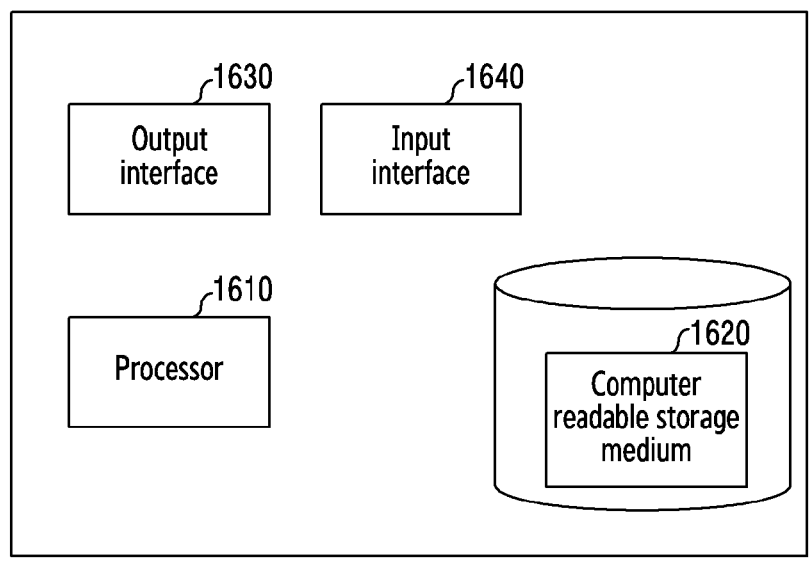

APPARATUS AND A METHOD FOR DETERMINING ACTIVATION STATE OF SECONDARY CELL AND USER EQUIPMENT IN WIRELESS COMMUNICATION SYSTEM

PRIORITY

This application is a National Phase Entry of International Application No. PCT/KR2019/012660, which was filed on Sep. 27, 2019, and claims priority to Chinese Patent Application Nos. 201811133785.4 and 201910262503.9, filed in the Chinese Intellectual Property Office on Sep. 27, 2018 and Apr. 2, 2019, respectively, the entire content of each of which is incorporated herein by reference.

TECHNICAL FIELD

The present disclosure relates to the field of wireless communications technology, and in particular to a method for determining the activation state of a secondary cell and a user equipment.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. In a New Radio (NR) air interface system, in order to increase the data throughput of a User Equipment (UE), the UE may operate in a carrier aggregation state. That is, the UE may simultaneously receive and/or transmit data on a plurality of serving cells. According to the amount of traffic that the UE needs to transmit and receive and the performance of each serving cell, the base station may activate or deactivate a secondary cell through a Medium Access (MAC) layer signaling. However, when the UE operates in a carrier aggregation state, it costs more electricity than when it operates in a serving cell. If the amount of data of the UE is small, it is not necessary for the UE to operate in a carrier aggregation state. In the current protocol, it takes a long time to activate and/or deactivate through a MAC layer signaling, and the cell activation time is longer, resulting in a long-time delay for the UE to receive or transmit data. It takes a long time to deactivate a secondary cell, resulting in a large power consumption of the UE.

DISCLOSURE OF INVENTION

Solution to Problem

The present invention provides a method for determining an activation state of a secondary cell and a User Equipment (UE), which can solve the problems of long-time delay for transmitting or receiving data in uplink and downlink and large power consumption of the UE. The technical solutions are as follows:

According to a first aspect, there is provided a method for determining an activation state of a secondary cell, comprising:

acquiring secondary-cell activation state indicator (SCASI) information; and determining a state corresponding to at least one secondary cell configured or reconfigured by a UE based on the SCASI information, the states comprising: an activation state and an inactivation state.

According to a second aspect, there is provided a UE, comprising:

an acquisition module configured to acquire secondary-cell activation state indicator (SCASI) information;

a first determination module configured to determine a state corresponding to at least one secondary cell configured or reconfigured by a UE based on the SCASI information, the states comprising: an activation state and an inactivation state.

According to a third aspect, there is provided a UE, comprising:

an antenna;

a processor; and a memory configured to store machine-readable instructions that, when executed by the processor, cause the processor to perform the method for determining the activation state of the secondary cell shown in the first aspect.

The technical solution provided by the embodiment of the application has the beneficial effects that:

The present application provides a method and a UE for determining an activation state of a secondary cell. Compared with the prior art in which the activation state or deactivation state of a secondary cell is determined through an MAC layer signaling, the application acquires the SCASI information, and then determines the states corresponding to at least one secondary cell configured or reconfigured by the UE based on the a SCASI information. The states include: an activation state and an inactivation state. That is, the UE determines the time delay of the state corresponding to any secondary cell is shorter than the time delay of determining the activation or deactivation of the secondary cell through the MAC layer signaling according to the SCASI information, so that the time delay of the activation and/or deactivation of the secondary cell may be reduced, the time delay of the UE receiving or transmitting data may be further reduced, and the power consumption of the UE may be reduced.

BRIEF DESCRIPTION OF DRAWINGS

FIG. 1 illustrates a wireless communication system according to an embodiment.

FIG. 2 illustrates a base station 110 in a wireless communication system according to an embodiment.

FIG. 3 illustrates a terminal 120 in a wireless communication system according to an embodiment.

FIG. 4 illustrates a communication unit 210 or 310 in a wireless communication system according to an embodiment.

FIG. 5 illustrates a flowchart of a method for determining an activation state of a secondary cell in a wireless communication system according to an embodiment of the present application;

FIG. 6 illustrates a schematic diagram of a mapping relationship of the CADI and the activation state of the downlink secondary cell in a wireless communication system according to an embodiment of the application;

FIG. 7 illustrates a schematic diagram of a secondary-cell activation time in a wireless communication system according to an embodiment of the application;

FIG. 8 illustrates a schematic diagram of another secondary-cell activation time in a wireless communication system according to an embodiment of the application;

FIG. 9 illustrates a schematic diagram of another secondary-cell activation time in a wireless communication system according to an embodiment of the application;

FIG. 10 illustrates a schematic diagram of a same timing relationship being adopted at a secondary-cell activation time and a secondary-cell deactivation time in a wireless communication system according to an embodiment of the present application;

FIG. 11 illustrates a schematic diagram of different timing relationships being adopted at a secondary-cell activation time and a secondary-cell deactivation time;

FIG. 12 illustrates a schematic diagram of a BWP switching operation of a UE in a wireless communication system according to an embodiment of the present application;

FIG. 13 illustrates a schematic device structure diagram of a UE in a wireless communication system according to an embodiment of the application;

FIG. 14 illustrates a schematic device structure diagram of another UE in a wireless communication system according to an embodiment of the application;

FIG. 15 illustrates a schematic structural diagram of a UE in a wireless communication system according to an embodiment of the application; and FIG. 16 illustrates a frame diagram of a computing system in a wireless communication system according to an embodiment of the present application.

BEST MODE FOR CARRYING OUT THE INVENTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or 6coupling. As used herein, term "and/or" includes all or any of one or more associated listed items or combinations thereof.

In order to solve the technical problems in the prior art, it is necessary to provide a method capable of activating and/or deactivating a secondary cell more quickly, so as to reduce the time delay of activating and/or deactivating the secondary cell, and ensure the throughput level of transmitting data and receiving data of the UE while saving power consumption of the UE.

Specifically, when the amount of data that the UE needs to transmit or receive is small, the UE may activate only a part of the configured or reconfigured secondary cells, or only one secondary cell, thus saving the power consumption of the UE. When the amount of data that needs to be received or sent is large, the UE may activate most of the configured or reconfigured secondary cells, or even activate all the secondary cells, thus ensuring large data throughput.

The following method for determining the states corresponding at least one secondary cell and activating and/or deactivating the secondary cell is introduced through specific embodiments as follows:

The embodiments of the application describe that when the UE is configured with more than one downlink serving cell (including a primary cell and a secondary cell) and the amount of data that the UE needs to receive or transmit is small, the UE only receives data and control signaling in a part of the configured serving cells or transmits data in order to save power. That is, the UE has at least one activation downlink serving cell (being a primary cell if there is only one downlink serving cell, or including a primary cell and at least one secondary cell if there are multiple downlink serving cells). Or, the UE may receive data and control signaling in all configured serving cells (a primary cell and all secondary cells) when the UE needs to receive or when the amount of data is large, and the UE only receives a Physical Downlink Control Channel (PDCCH) and a Physical Downlink Shared Channel (PDSCH) on the active downlink serving cell and the UE does not receive the PDCCH and the PDSCH on the inactive downlink serving cells (including only secondary cells in the inactivation state).

The UE determines one or more active downlink secondary cells by receiving a MAC layer signaling. For example, the UE configures or reconfigures four secondary serving cells by receiving a UE-specific high layer signaling, and determines two active downlink secondary cells by receiving the MAC layer signaling. At this time, the UE may simultaneously receive a PDCCH and a PDSCH on the two active secondary serving cells and a primary cell.

Then, the UE dynamically changes the activation state of the downlink secondary cell by receiving a physical layer signaling, and the state of the downlink secondary cell includes an activation state and an inactivation state. That is, the UE may receive the PDCCH and the PDSCH on the downlink secondary cell and the primary cell in the activation state, the UE cannot receive the PDCCH and the PDSCH on the downlink secondary cell in the inactivation state, the downlink secondary cell may convert from the activation state to the inactivation state. The UE may also convert from an inactivation state to an activation state. The UE dynamically changes the activation state of the downlink secondary cell through the physical layer signaling (for example, the physical layer signaling may be a DCI) and/or a timer mode, as shown below.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

FIG. 4 illustrates a communication unit 210 or 310 in a wireless communication system according to an embodiment. FIG. 4 depicts a detailed configuration of the wireless communication unit 210 of FIG. 2 or the communication unit 310 of FIG. 3. More specifically, FIG. 4 depicts components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit (or transmission) paths 406-1 through 406-N, and an analog beamformer 408.

The encoder and modulator 402 performs channel encoding. To perform the channel encoding, at least one of a low density parity check (LDPC) code, a convolution code, and a polar code may be used. The encoder and modulator 402 generates modulation symbols through constellation mapping.

The digital beamformer 404 beamforms a digital signal (e.g., the modulation symbols). To this end, the digital beamformer 404 may multiply or apply beamforming weights to the modulation symbols. Herein, the beamforming weights are used to change a level and a phase of a signal and may be referred to as a precoding matrix or a precoder. The digital beamformer 404 outputs the digital-beamformed modulation symbols to the plurality of transmit paths 406-1 through 406-N. In this case, according to a multiple input multiple output (MIMO) transmission scheme, the modulation symbols may be multiplexed or the same modulation symbols may be fed to the plurality of transmit paths 406-1 through 406-N.

The transmit paths 406-1 through 406-N convert the digital-beamformed digital signals to analog signals. To this end, the transmit paths 406-1 through 406-N each may include an inverse fast Fourier transform (IFFT) operator, a cyclic prefix (CP) adder or inserter, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. To this end, the analog beamformer 408 may multiply or apply the beamforming weights to the analog signals. Herein, the beamforming weights are used to change the level and the phase of the signal. More specifically, the analog beamformer 408 may be variously configured, according to a connection structure between the transmit paths 406-1 through 406-N and the antennas. For example, the transmit paths 406-1 through 406-N each may be connected to one antenna array, or the transmit paths 406-1 through 406-N may be connected to one antenna array. Further, the transmit paths 406-1 through 406-N may be adaptively connected to one antenna array, or may be connected to two or more antenna arrays.

FIG. 5 illustrates a flowchart of a method for determining an activation state of a secondary cell in a wireless communication system according to an embodiment of the present application, as follows:

Step S501: acquiring secondary-cell activation state indicator (SCASI) information.

Step S502: determining a state corresponding to at least one secondary cell configured or reconfigured by a UE based on the SCASI information.

Wherein, the state corresponding to at least one secondary cell in step S502 include:

activation state and inactivation state.

Specifically, Step S501 includes at least one of step S5011 (not shown) and Step S5012 (not shown), wherein, Step S5011: acquiring the SCASI information from received downlink control information (DCI).

Step S5012: acquiring the activation state indicator information corresponding to respective secondary cells currently in the activation state through predefined timers corresponding to respective secondary cells currently in the activation state.

For the embodiment of the present application, by the acquired SCASI information from the received DCI and/or by the predefined timers corresponding to respective secondary cells currently in the activation state, acquiring the activation state indicator information respectively corresponding to respective secondary cells currently in the activation state, the state corresponding to at least one secondary cell configured or reconfigured by the UE is determined. That is, for the UE, the time delay for determining the state corresponding to any secondary cell is shorter than that for determining activation or deactivation of the secondary cell through an MAC layer signaling according to the above information, so that the time delay for activation and/or deactivation of the secondary cell may be reduced, further the time delay for the UE to receive or transmit data may be reduced, and the power consumption of the UE may be reduced.

Specifically, Step S5011 includes: At least one of step S5011a (not shown), step S5011b (not shown) and step S5011c (not shown), wherein, Step S5011a, acquiring secondary-CAI information of respective secondary cells corresponding to scheduled PDSCHs from the DCI in a PDCCH for scheduling a PDSCH;

Step S5011b, acquiring secondary-CDI information of respective secondary cells corresponding to scheduled PDSCHs from the DCI in the PDCCH for scheduling the PDSCH;

Step S5011c: acquiring secondary-Cell Activation/Deactivation Indicator (CADI) information from the DCI in the PDCCH which is specially used for indicating activation/deactivation of downlink secondary cells.

Specifically, step S5012 includes step S5012a (not shown), wherein,

Step S5012a: acquiring a predefined current timer value corresponding to the secondary cell currently in the activation state as activation state indicator information corresponding to the secondary cell currently in the activation state.

Specifically, step S502 includes at least one of step S5021 (not shown), step S5022 (not shown), step S5023 (not shown) and step S5024 (not shown), wherein, Step S5021, determining the state of the secondary cell corresponding to the scheduled PDSCH based on the CAI in the PDCCH for scheduling the PDSCH.

Step S5022, determining the state of the secondary cell corresponding to the scheduled PDSCH based on the CDI in the PDCCH for scheduling the PDSCH.

Step S5023, determining states corresponding to respective secondary cells configured or reconfigured by the UE based on the CADI information in the PDCCH for scheduling the PDSCH.

Step S5024, determining the state corresponding to the secondary cell currently in the activation state based on the predefined current timer value corresponding to the secondary cell currently in the activation state and the predefined timing value.

Specifically, step S5024 includes step S5024a (not shown) and step S5024b (not shown), wherein, Step S5024a, determining that the secondary cell currently in the activation state needs to be converted from the activation state to the inactivation state, if the predefined current timer value corresponding to the secondary cell currently in the activation state is not less than the predefined timing value;

Step S5024b, determining that the secondary cell currently in the activation state is still in the activation state, if the predefined current timer value corresponding to the secondary cell currently in the activation state is less than the predefined timing value.

Further, the method further includes: Step Sa (not shown in the figure), wherein, Step Sa, determining the state corresponding to the secondary cell currently in the activation state based on the predefined current timer value corresponding to the secondary cell currently in the activation state and the predefined timing value, if the DCI is not acquired in a predefined time unit.

For the embodiment of the present application, when the CDI and/or the CADI are not acquired within a predefined time, the state corresponding to the secondary cell currently in the activation state is determined based on the predefined current timer value corresponding to the secondary cell currently in the activation state and the predefined timing value.

In one possible implementation, step S502, the method may further include: detecting the PDCCH in the determined secondary cell in the activation state.

For the embodiment of the present application, if the PDCCH is detected, downlink data is received.

Further, the method further includes step Sb (not shown in the figure), wherein, Step Sb, determining an activation time corresponding to the secondary cell to be activated and/or a deactivation time corresponding to the secondary cell to be deactivated.

Wherein, step Sb may be executed simultaneously with step S502 or may be executed after step S502. It is not limited in the embodiments of the present application.

For the embodiment of the present application, the secondary cell to be activated in step Sb is the secondary cell to be converted from the inactivation state to the activation state, and the secondary cell to be deactivated is the secondary cell to be converted from the activation state to the inactivation state.

Specifically, step Sb includes step Sb1 (not shown), step Sb2 (not shown) and step Sb3 (not shown), wherein, Step Sb1, determining a reference time unit.

Step Sb2, determining a reference time according to the determined reference time unit.

Step Sb3, determining the activation time corresponding to the secondary cell to be activated and/or the deactivation time corresponding to the secondary cell to be deactivated according to the determined reference time.

Specifically, step Sb2 includes: at least one of step Sb2a (not shown in the figure) and step Sb2b (not shown in the figure), wherein, In step Sb2a, determining the activation reference time corresponding to the secondary cell to be activated, based on the received Cell Activation Timing indicator (CATI).

Step Sb2b, determining the deactivation reference time of the secondary cell to be deactivated through the received high layer signaling.

Specifically, step Sb2a includes step Sb2a1 (not shown in the figure), wherein,

Step Sb2a1, determining the activation reference time corresponding to the secondary cell to be activated, based on the number of reference time units carried by the CATI for indicating the difference between the time when the CADI is received and the reference time when the secondary cell is activated and/or deactivated.

Specifically, step Sb2b includes step Sb2b1 (not shown in the figure), wherein,

Step Sb2b1, determining the deactivation reference time of the secondary cell to be deactivated based on the number of reference time units carried in the high layer signaling for the difference between the time when the CADI is received and the deactivation reference time of the secondary cell.

In one possible implementation, the duration of the reference time unit includes at least one of the following: a predefined duration value; a time slot length or an Orthogonal Frequency Division Multiplexing (OFDM) symbol length of the Bandwidth Part (BWP) with a largest subcarrier spacing (SCS) in the secondary cell to be activated or the secondary cell to be deactivated; a time slot length or an OFDM symbol length of BWP with a smallest SCS in the secondary cell to be activated or the secondary cell to be deactivated; a duration value configured by a higher layer signaling.

Specifically, step Sb3 includes: a least one of step Sb3a (not shown in the figure) and step Sb3b (not shown in the figure), wherein, Step Sb3a, taking the time when the secondary cell to be activated and/or deactivated overlaps with the reference time as the activation time corresponding to the secondary cell to be activated and/or the deactivation time corresponding to the secondary cell to be deactivated.

Step Sb3b, taking the next time of the time when the secondary cell to be activated and/or deactivated overlaps with the reference time as the activation time corresponding to the secondary cell to be activated and/or the deactivation time corresponding to the secondary cell to be deactivated.

The embodiments of the present application provide a method for determining an activation state of a secondary cell. Compared with the prior art in which the activation state or deactivation state of a secondary cell is determined through an MAC layer signaling, the embodiments of the present application acquire the SCASI information, and then determines the states corresponding to at least one secondary cell configured or reconfigured by the UE based on the a SCASI information. The states include: an activation state and an inactivation state. That is, the UE determines the time delay of the state corresponding to any secondary cell is shorter than the time delay of determining the activation or deactivation of the secondary cell through the MAC layer signaling according to the SCASI information, so that the time delay of the activation and/or deactivation of the secondary cell may be reduced, the time delay of the UE receiving or transmitting data may be further reduced, and the power consumption of the UE may be reduced.

The technical solutions of the present application and how the technical solutions of the present application solve the above technical problems will be described in detail below with specific examples. The following several specific embodiments may be combined with each other, and the same or similar concepts or processes may not be repeated in some embodiments. Embodiments of the present application will be described below with reference to the accompanying drawings.

The method for determining an activation state of a serving cell of the present application will be explained by several embodiments below. The activation information may be any form of information having a function of indicating the determination of the activation state of the secondary cell, for example, the indicator information in Downlink Control Information (DCI) received by the UE, wherein the activation state of the secondary cell refers to whether the secondary cell is a serving cell in an activation state or a serving cell in an inactivation state. The activation state of the secondary cell can be changed, but the activation state of the primary cell may not be changed. The primary cell is always in the activation state. "Changing the serving cell in the activation state" in the following refers to "changing the activation state of the secondary cell".

Wherein, the method for determining the activation state of the secondary cell of the present application includes Embodiments 1, 2 and 3, wherein Embodiment 1 introduces the method for determining the secondary cell in the activation state or the secondary cell in the inactivation state by receiving DCI in the PDCCH for scheduling the PDSCH, and/or determining the secondary cell in the inactivation state by a timer. Embodiment 2 mainly introduces the case of determining the secondary cell in the activation state or the secondary cell in the inactivation state by receiving the DCI in the PDCCH specially used for indicating activation or deactivation of the downlink secondary cell, and/or the method for determining the secondary cell in the inactivation state by a timer. Embodiment 3 mainly introduces the method for determining the time of cell activation and/or the time of cell deactivation, specifically as follows:

Embodiment 1

The embodiment of the application introduces the method for determining the secondary cell in the activation state or the secondary cell in the deactivation state by receiving DCI in the PDCCH for scheduling the PDSCH, and/or determining the secondary cell in the inactivation state by a timer, which includes a first specific example, a second specific example, a third specific example and a fourth specific example. Wherein, the first specific example introduces the way to determine whether there is a new secondary cell in the activation state by receiving a serving CAI field in the DCI in the PDCCH for scheduling the PDSCH. The second specific example introduces determining whether the active downlink secondary cell is in an inactivation state through a timer. The third specific example introduces the method for determining the secondary cell in the deactivation state by receiving the serving Cell Deactivation Indicator (CDI) field in the DCI in the PDCCH for scheduling the PDSCH. The fourth specific example introduces the application scenario of the combination of the second specific example and the third specific example as follows:

First Specific Example

This specific example introduces a way of determines whether there is a newly-added secondary cell in an activation state by receiving a serving CAI field in DCI in a PDCCH for scheduling a PDSCH.

A UE indicates to activate a downlink secondary cell by receiving bits in the DCI in the PDCCH for scheduling the PDSCH. These bits are called serving CAI fields. If the downlink secondary cell indicated by the CAI field includes the downlink secondary cell where the DCI is received, there is no newly-added active secondary cell (i.e., there is no need to convert the secondary cell currently in the inactivation state into the activation state), and the number of secondary cells in the activation state remains unchanged. If the downlink secondary cell indicated by the CAI field is not included in the downlink secondary cell where the DCI is received, the CAI field indicates the newly-added active downlink secondary cell, the secondary cell where the CAI field is transmitted is still the downlink secondary cell in the activation state, and the number of serving cells in the activation state increases.

For example, the UE configures or reconfigures four downlink secondary cells by receiving UE-specific high layer signaling, which are cell-1, cell-2, cell-3 and cell-4, respectively. The CAI indicator is 2 bits and the mapping relationship between the CAI indicator and the active downlink secondary cells is shown in Table 1.

TABLE 1

| CAI indicator value | Downlink secondary cell in activation state |
| --- | --- |
| 00 | cell-1 |
| 01 | cell-2 |
| 10 | cell-3 |
| 11 | cell-4 |

Second Specific Example

This specific example introduces determining whether the active downlink secondary cell is in a deactivation state through a timer, specifically as follows:

For a downlink secondary cell in an activation state, whether the downlink secondary cell in the activation state is still in the activation state may be determined through a timer. In other words, a timer timing value is configured, when the UE receives the DCI on the downlink secondary cell in the activation state, the timer is set to 0. If the DCI is not received, the timer is accumulated by 1. When the timer accumulation reaches a predefined timing value, then the downlink secondary cell in the activation state becomes the downlink secondary cell in the inactivation state, thus the unused downlink secondary cell in the activation state may be converted to the inactivation state, thereby saving UE power. For example, the configured timer timing value is 10, when the UE receives the DCI on the active downlink secondary cell 1 in time slot N, the timer is set to 0. The UE does not receive the DCI on the active downlink secondary cell in time slot n+1, the timer becomes 1, the UE does not receive the DCI on the active downlink secondary cell 1 from time slot n+2 to time slot n+10, the timer becomes 10, and the downlink secondary cell 1 in the activation state is converted to the inactivation state. In this way, the unused downlink secondary cell in the activation state may be converted into the inactivation state, thereby saving power.

Third Specific Example

This specific example introduces a method for determining a secondary cell in a deactivation state by receiving serving CDI fields in the DCI in the PDCCH for scheduling the PDSCH, specifically as follows:

The UE deactivates the secondary cell by receiving bits in the DCI in the PDCCH, these bits are called CDI fields, and the CDI fields indicate downlink secondary cells that are currently in an activation state to be converted into an inactivation state. The downlink secondary cell indicated by the CDI field may be a secondary cell where the CDI is transmitted, and the downlink secondary cell indicated by the CDI field may also be other downlink secondary cells in the activation state. For example, the UE configures or reconfigures four downlink secondary cells by receiving the UE-specific high layer signaling, which are cell-1, cell-2, cell-3 and cell-4, respectively, the CDI indicator is 2 bits, and the mapping relationship between the CDI indicating deactivation of the downlink secondary cell and the downlink secondary cell is shown in Table 2.

TABLE 2

| CDI indicator value | Deactivate downlink serving cell |
| --- | --- |
| 00 | cell-1 |
| 01 | cell-2 |
| 10 | cell-3 |
| 11 | cell-4 |

Fourth Specific Example

This specific example introduces the application scenario of the combination of the second specific example and the third specific example, as follows:

If the UE receives the CDI field in the DCI in the PDCCH indicating to deactivate a serving cell, the downlink secondary cell is converted from the activation state to the inactivation state. In addition, if the UE does not receive the CDI field in the DCI in the PDCCH indicating to deactivate one serving cell within a certain period of time, but according to the timer mode in the second specific example, when the timer accumulation reaches the predefined timing value, the downlink secondary cell still needs to be converted from the activation state to the inactive serving cell state, and the method may prevent the UE from wasting power due to failure to indicate the secondary cell that needs to be deactivated when the UE loses the CDI.

Embodiment 2

This embodiment mainly introduces the case of determining the secondary cell in the activation state or the secondary cell in the inactivation state by receiving the DCI in the PDCCH specially used for indicating activation or deactivation of the downlink secondary cell, and/or the way of determining the secondary cell in the inactivation state by a timer, which including two specific examples. The first specific example introduces the method for determining the current activation state of the secondary cell by a serving Cell Activation/Deactivation indicator (CADI) field. The second specific example introduces an application scenario that combines the first specific example and the way of determining the activation state of the secondary cell through a timer mode, as shown below, wherein, First Specific Example This specific example introduces the way for determining the current activation state of the secondary cell through the serving CADI field, specifically as follows:

The UE indicates activation/deactivation of the downlink serving cell by receiving fields in the DCI in the PDCCH specially used to indicate activation/deactivation of the downlink serving cell. These bits are called CADI fields, and the number of bits in this field is the same as the number of downlink secondary cells configured by the UE, or the number of bits in this field is determined by high layer signaling configuration or by protocol predefined. A bit map method may be used to indicate that each bit in the CADI field indicates whether one downlink secondary cell is in activation state or inactivation state. For example, a bit value of "1" indicates that the downlink secondary cell is in an activation state, and a bit value of "0" indicates that the downlink secondary cell is in an inactivation state.

For example, the UE configures or reconfigures four downlink secondary cells, which are cell-1, cell-2, cell-3 and cell-4, respectively, by receiving a UE-specific high layer signaling. The CADI is 4 bits, and the mapping relationship between the CADI and the activation state of the downlink secondary cell is shown in FIG. 6. Wherein the first bit in the CADI field indicates the current state (activation state or inactivation state) of cell-1. The second bit in the CADI field indicates the current state of cell-2, the third bit in the CADI field indicates the current state of cell-3, and the fourth bit in the CADI field indicates the current state of cell-4.

Second Specific Example

This specific example introduces an application scenario that combines the first specific example and the way for determining the activation state of the secondary cell through a timer, as follows:

Using the first specific example, the field CADI indicator in the DCI can be applied to determine the deactivated secondary cell. However, the UE may miss the detection of the DCI. When the base station knows that the UE has not received the CADI indicator and retransmits the CADI indicator, it needs to cost more time. At this time, the UE cannot deactivate the secondary cell in time, thus wasting the power of the UE. Therefore, on the basis of the first specific example, a method for determine the deactivation of the serving cell by means of adding a timer is provided. The method is to configure a timer timing value. If the UE receives a CADI field indicator in the DCI in the PDCCH to deactivate a serving cell, the downlink secondary cell converts to the inactivation state. If the UE does not receive the CADI field indicator in the DCI in the PDCCH to deactivate a serving cell and the UE receives DCI in an active downlink secondary cell, the timer is set to 0. If the UE does not receive DCI in this active downlink serving cell within a certain period of time, the timer is accumulated by 1. When the timer accumulation reaches the predefined timing value, the serving cell in the activation state converts to the inactivation state.

Embodiment 3

This embodiment mainly introduces the way for determining the time of cell activation and/or the time of cell deactivation, as follows:

This embodiment describes that when one CADI field is a field in a PDCCH specifically used to indicate activation/deactivation of downlink serving cells, the activation/deactivation timing of each activation/deactivation secondary cell is determined. For example, when more than two downlink serving cells are simultaneously indicated to be activated/deactivated using a CADI field in Embodiment 2, the activation/deactivation timing of each activation/deactivation serving cell is determined by using the method described below. However, when a CAI field or CDI field is a field in the PDCCH for scheduling the PDSCH, the downlink serving cell activation/deactivation time is the PDSCH transmission time indicated in the PDCCH for scheduling the PDSCH, and will not be specifically described here.

For example, the UE configures or reconfigures four downlink secondary cells by receiving the UE-specific high layer signaling, which are cell-1, cell-2, cell-3 and cell-4, respectively, the slot length of cell-1 is 1 millisecond, the slot length of cell-2 is 0.5 milliseconds, the slot length of cell-3 is 0.25 milliseconds, and the slot length of cell-4 is 0.5 milliseconds.

When the UE indicates the increase of the secondary cells in the activation state among the downlink secondary cells by receiving the bit CATI field in the DCI in the PDCCH, the UE may add the serving Cell Activation Timing Indicator (CATI) field in the DCI in the PDCCH for indicating the activation of the downlink secondary cell to indicate the start time of activating the new serving cell. The SCS of a plurality of active service cells newly added at the same time may be different. A time unit of the CATI field is defined to indicate the start time of the newly-added active serving cell. The time unit of the CATI field may be predefined by a protocol, for example, the time unit is 0.125 milliseconds. Or, the slot length or OFDM symbol length of the serving cell with the largest SCS (or the smallest SCS) in all serving cells configured by the UE (if a serving cell is configured with multiple BWPs, the slot length of BWP with the largest SCS or the smallest SCS is selected as the slot length of the serving cell) is selected as the reference time unit of the CATI field, and the SCS of the serving cell is selected as the reference SCS. By this method, the activation of the secondary cell may be started timelier.

For example, the UE configures or reconfigures four downlink secondary cells, which are cell-1, cell-2, cell-3 and cell-4, respectively, by the receiving UE-specific high layer signaling. Wherein, the time slot length of cell-1 is 1 millisecond, the time slot length of cell-2 is 0.5 millisecond, the time slot length of cell-3 is 0.5 millisecond, and the time slot length of cell-4 is 0.25 millisecond. If the CADI indicates that cell-1 and cell-4 are newly-added active secondary cells and the time slot length of cell-1 is used as a reference time unit, the time slot length is 1 millisecond, and if the time slot length of cell-4 is used as a reference time unit, the time slot length is 0.25 milliseconds. If the delay of the newly-added active secondary cell is 0.5 milliseconds, the time slot length of cell-1 is used as the reference time unit, and the delay of the newly-added active secondary cell is 1 millisecond. When the time slot length of cell-4 is used as the reference time unit, the delay of the newly-added active secondary cell is 0.5 milliseconds, as shown in FIG. 7.

The time interval between the start time of the newly-added active secondary cell and the end time of the OFDM symbol of the PDCCH by the UE receiving the bit CADI field in the DCI in the PDCCH is determined by the higher layer signaling configuration or by protocol predefined. When the SCS of the indicated newly-added active serving cell (or BWP) is smaller than the reference SCS, the activation time of the newly-added active secondary cell is time at which the time unit of the first newly-added active secondary cell starts simultaneously with the activation time of the newly-added active secondary cell indicated by the time unit of the reference SCS or after the start of the activation time of the newly-added active secondary cell indicated by the time unit of the reference SCS (e.g., OFDM symbol, or time slot). For example, the reference SCS is 30 kHz, the SCS of the newly-added active secondary cell is 15 KHz, and the OFDM symbol length of the reference SCS is used as the time unit of the activation time of the newly-added active secondary cell. As shown in FIG. 8, the activation time of the newly-added active secondary cell is the time of the OFDM symbol starts simultaneously with the activation time of the newly-added secondary serving cell indicated by the OFDM symbol of the reference SCS. Or, as shown in FIG. 9, the activation time of the newly-added active secondary cell is the time of the OFDM symbol after the start of the activation time of the newly-added active secondary cell indicated by the OFDM symbol of the reference SCS.

For a secondary cell which is converted from an activation state to an inactivation state, the time converting from the activation state to the inactivation state may be the same as the time when the newly-added active serving cell starts to be activated, that is, the activation time of the newly-added active serving cell and the deactivation of the deactivated serving cell uses the same timing relationship, as indicated by CATI. As shown in FIG. 10, cell-1 is converted from the active serving cell to the inactive serving cell, cell-2 is converted from the inactive serving cell to the active serving cell. The UE receives the CADI in time slot N, wherein CATI is 2, then cell-1 is converted from an active serving cell to an inactive serving cell in time slot n+2, and cell-2 is converted from an inactive serving cell to an active serving cell in time slot n+2.

Or, the deactivation time of the deactivation serving cell and the newly-added active serving cell use different timing relationships, wherein the timing relationship of the newly-added active serving cell is indicated by the CATI, the timing relationship of the deactivation serving cell is configured by a high layer signaling, or the timing relationship is predefined by the protocol. For example, the time delay for deactivating the serving cell is 0.5 milliseconds, that is, the difference between the time when an instruction of deactivation of the serving cell is received and the time when the serving cell is deactivated is 0.5 milliseconds. As shown in FIG. 11, the slot length of cell-1 and cell-2 is 0.5 milliseconds, cell-1 is converted from the active serving cell to the inactive serving cell, cell-2 is converted from the inactive serving cell to the active serving cell, and the UE receives the CADI in slot n. Wherein, when the CATI is 2, cell-1 is converted from an active serving cell to an inactive serving cell in time slot n+2, and cell-2 is converted from an inactive serving cell to an active serving cell in time slot n+1.

In the above manner, it is avoided that the reception of the PDCCH will be affected due to different understandings of the activation time between the base station and the UE after activating the serving cell.

Or, the UE starts the next OFDM symbol after receiving the ending OFDM symbol of the PDCCH indicating the CADI field. This method may end the reception of data and control signaling on the deactivation serving cell as soon as possible, thus saving more power.

All described above is that the base station determines the activation state of the secondary cell according to the situation of the traffic required to be transmitted. The base station can accurately know the situation of the downlink traffic required to be transmitted and can determine the activation state of the secondary cell according to the situation of the downlink traffic required to be transmitted, thus not only ensuring the transmission of the downlink traffic, but also adjusting the activation state of the secondary cell in time, thereby saving power. However, the base station cannot accurately know the situation of the uplink and downlink traffic required to be transmitted, so the base station cannot adjust the activation state of the secondary cell in time according to the situation of downlink traffic required to be transmitted. At this time, the UE may provide the base station with suggestion information for adjusting the activation state of the secondary cell, the suggestion information may be transmitted through the transmission method of Uplink Control Information (UCI). For example, the suggestion information may be 1 bit. When the bit value of the suggestion information is "0", the base station is suggested to deactivate the uplink transmission of this secondary cell. When the bit value of the suggestion information is "1", the base station is suggested to activate the uplink transmission of this secondary cell. Alternatively, when the UE suggests the base station to deactivate the uplink transmission of this secondary cell, the UE transmits the suggestion information bit, and the UE does not transmit the suggestion information in other cases. Through the transmission of the physical layer signaling suggestion information, the base station may determine the activation state of the secondary cell according to the uplink traffic required to be transmitted, thereby not only ensuring the transmission of the uplink traffic, but also adjusting the activation state of the secondary cell in time, thereby saving power.

After the UE transmits the suggestion information to suggest the base station to deactivate the uplink transmission of the secondary cell, the UE stops detecting the PDCCH scheduling the uplink data of the secondary cell, which can save power. However, it is possible that the base station has not received the suggestion information, and the base station may also schedule the uplink data for the UE, while the UE stops detecting the PDCCH scheduling the uplink data of the secondary cell.

Another method is that after the UE transmits the suggestion information to suggest the base station to deactivate the uplink transmission of the secondary cell, the UE does not stop detecting the PDCCH scheduling the uplink data of the secondary cell until the base station indicates the UE to deactivate the serving cell, and the UE stops detecting the PDCCH scheduling the uplink data of the secondary cell. With this method, the above problems will be avoided.

In order to save power for the UE, the UE may dynamically determine different PDCCH monitoring configurations according to the amount of data required to be transmitted. When the amount of the data is large, the PDCCH monitoring period is a short, more monitoring times, and more Aggregation Level (AL) candidates for monitoring, which may timely transmit data. When the amount of data is small, the PDCCH monitoring period is long, fewer monitoring times, and fewer AL candidates for monitoring, which may save power.

The switching operation of the active downlink Bandwidth Part (BWP) needs to be performed first, that is, the switching from the current active downlink BWP to the target active downlink BWP. There are two ways to trigger the switching of the active downlink BWP. The first way is to trigger the switching of the active downlink BWP by receiving a DCI indicator for scheduling a PDSCH. The second way is to trigger the switching of the active downlink BWP by a Timer, that is, when the timer expires, the active downlink BWP of the UE is converted to the default downlink BWP. The timer value (bwp-InactivityTimer) of the timer to trigger the switching of the active downlink BWP is configured by a high layer signaling. If the period for PDCCH monitoring is also configured by the high layer signaling, the base station may configure the UE with an appropriate timer value. In order to save power for the UE, when the period for PDCCH monitoring is converted by a dynamic indicator (for example, a DCI indicator), the timer value of the downlink BWP switching may not be applicable. For example, when the period P1 for monitoring PDCCH activating downlink BWP1 is greater than the timer value T of the downlink BWP switching, it will appear that the UE has not waited for the PDCCH period of the next period after activating downlink BWP1 to receive one PDCCH. According to the timer value T of the BWP switching, the active downlink BWP of the UE is converted to the default downlink BWP, and the UE cannot continuously receive data in the downlink BWP1, as shown in FIG. 12. In order to solve this problem, the timer value T of the BWP switching may be dynamically changed, and a set T_s of timer values of the BWP switching may be configured through the high layer signaling, for example, T_s includes {T1, T2, T3, T4}, and then one value in the set T_s is indicated as the timer value of the BWP switching through the explicit dynamic signaling or implicit dynamic signaling. The method that one value in the set T_s is indicated as the timer value of the BWP switching through the explicit dynamic signaling may be to contain the timer value indicator information of the BWP switching in the DCI, for example, the timer value indicator information of the BWP switching is 2 bits, and the indication method is shown in Table 3.

TABLE 3

| Timer value indicator information values of a BWP switching | Timer values of a BWP switching |
| --- | --- |
| 00 | T1 |
| 01 | T2 |

TABLE 3-continued

| Timer value indicator information values of a BWP switching | Timer values of a BWP switching |
| --- | --- |
| 10 | T3 |
| 11 | T4 |

The method that one value in the set T_s is indicated as the timer value of the BWP switching through the implicit dynamic signaling may be that different periods for PDCCH monitoring or configuration parameters for PDCCH detection correspond to one timer value of the BWP switching. For example, one period for PDCCH monitoring corresponds to one timer value of the BWP switching as shown in Table 4.

TABLE 4

| Periods for PDCCH monitoring | Timer values of a BWP switching |
| --- | --- |
| P1 | T1 |
| P2 | T2 |
| P3 | T3 |
| P4 | T4 |

Or, different active downlink BWPs are configured with independent timer values of the BWP switching. For example, the timer value of the BWP switching for the active downlink BWP1 is T1, that is, when BWP1 is an active downlink BWP, the timer value of the BWP switching for BWP1 is T1, and when BWP2 is an active downlink BWP, the timer value of the BWP switching for the active downlink BWP2 is T2.

In combination with the above embodiments, compared with the prior art, the present application has at least the following beneficial technical effects:

First, the activation state of the downlink secondary cell is determined through the dynamic SCASI information, thus saving the power consumption of the UE and ensuring the power saving of the UE and the throughput level of reception of data.

Secondly, when the secondary cells configured by the UE adopt different SCSs, a solution for determining a plurality of active downlink secondary cells is provided. Since different active downlink secondary cells adopt different timing solutions, the timely activation and/or deactivation of the secondary cells with different SCSs may be better ensured.

Thirdly, the activation state of the downlink secondary cell is determined through the combination of the dynamic SCASI information and the timing method, so that when the UE loses the activation information indicator, the UE may be deactivated in time, and the power consumption of the UE is saved.

Embodiment 4

The embodiment of the present application provides a UE, as shown in FIG. 13, the UE 1300 may include: an acquisition module 1301 and a first determination module 1302, wherein, The acquisition module 1301 is configured to acquire secondary-cell activation state indicator (SCASI) information.

The first determination module 1302 is configured to determine a state corresponding to at least one secondary cell configured or reconfigured by a UE based on the SCASI information acquired by the acquisition module 1301.

Wherein, the state includes: an activation state and an inactivation state.

The embodiment of the application provides a UE. Compared with the prior art in which the activation state or deactivation state of a secondary cell is determined through an MAC layer signaling, the embodiments of the present application acquire the SCASI information, and then determines the states corresponding to at least one secondary cell configured or reconfigured by the UE based on the a SCASI information. The states include: an activation state and an inactivation state. That is, the UE determines the time delay of the state corresponding to any secondary cell is shorter than the time delay of determining the activation or deactivation of the secondary cell through the MAC layer signaling according to the SCASI information, so that the time delay of the activation and/or deactivation of the secondary cell may be reduced, the time delay of the UE receiving or transmitting data may be further reduced, and the power consumption of the UE may be reduced.

Embodiment 5

The embodiment of the present application provides a UE, as shown in FIG. 14, the UE 1400 of the present application may include: an acquisition module 1401 and a first determination module 1402, wherein, The acquisition module 1401 is configured to acquire SCASI information.

Wherein, the acquisition module 1401 in FIG. 14 has the same or similar functions as the acquisition module 1301 in FIG. 13.

The first determination module 1402 is configured to determine a state corresponding to at least one secondary cell configured or reconfigured by a UE based on the SCASI information acquired by the acquisition module 1401.

Wherein, the state includes: an activation state and an inactivation state.

Wherein, the function of the first determination module 1402 in FIG. 14 is the same as or similar to that of the first determination module 1302 in FIG. 13.

Specifically, the acquisition module 1401 is specifically configured to SCASI information from the received DCI, and/or acquire the activation state indicator information corresponding to respective secondary cells currently in the activation state through predefined timers corresponding to respective secondary cells currently in the activation state.

Specifically, the acquisition module 1401 is further specifically configured to acquire secondary-CAI information of respective secondary cells corresponding to scheduled PDSCHs from the DCI in a PDCCH for scheduling a PDSCH, and/or acquire secondary-CDI information of respective secondary cells corresponding to scheduled PDSCHs from the DCI in the PDCCH for scheduling the PDSCH, and/or acquire secondary-Cell Activation/Deactivation Indicator (CADI) information from the DCI in the PDCCH which is specially used for indicating activation/deactivation of downlink secondary cells.

Specifically, the acquisition module 1401 is further specifically configured to acquire a predefined current timer value corresponding to the secondary cell currently in the activation state as activation state indicator information corresponding to the secondary cell currently in the activation state.

Specifically, the first determination module 1402 is specifically configured to determine the state of the secondary cell corresponding to the scheduled PDSCH based on the CAI in the PDCCH for scheduling the PDSCH; and/or determine the state of the secondary cell corresponding to the scheduled PDSCH based on the CDI in the PDCCH for scheduling the PDSCH; and/or determine states corresponding to respective secondary cells configured or reconfigured by the UE based on the CADI information in the PDCCH for scheduling the PDSCH; and/or determine the state corresponding to the secondary cell currently in the activation state based on the predefined current timer value corresponding to the secondary cell currently in the activation state and the predefined timing value.

Specifically, the first determination module 1402 is specifically further configured to determine that the secondary cell currently in the activation state needs to be converted from the activation state to the inactivation state, if the predefined current timer value corresponding to the secondary cell currently in the activation state is not less than the predefined timing value;

and/or determine that the secondary cell currently in the activation state is still in the activation state, if the predefined current timer value corresponding to the secondary cell currently in the activation state is less than the predefined timing value.

Further, as shown in FIG. 14, the UE 1400 further includes: a second determination module 1403, wherein, The second determination module 1403 is configured to determine the state corresponding to the secondary cell currently in the activation state based on the predefined current timer value corresponding to the secondary cell currently in the activation state and the predefined timing value, if the DCI is not acquired in a predefined time unit.

For the embodiment of the present application, the first determination module 1402 and the second determination module 1403 may be the same determination module or different determination modules. FIG. 14 only introduces a case where the first determination module 1402 and the second determination module 1403 are different determination modules, but it is not limited to the case shown in FIG. 14 in embodiments of the present application.

Further, as shown in FIG. 14, the UE 1400 further includes: a detection module 1404, wherein, the detection module 1404 is configured to detect the PDCCH in the determined secondary cell in the activation state.

Further, as shown in FIG. 14, the UE 1400 further includes: a third determination module 1405, wherein, the third determination module 1405 is configured to determine an activation time corresponding to the secondary cell to be activated and/or a deactivation time corresponding to the secondary cell to be deactivated.

Wherein, the third determination module 1405, at least one of the first determination module 1402 and the second determination module 1403 may be the same determination module or different determination modules. It is not limited in the embodiments of the present application.

In FIG. 14, only the case where the first determination module 1402, the second determination module 1403, and the third determination module 1405 are different determination modules is introduced, but is not limited to the case shown in FIG. 14.

Specifically, the third determination module 1405 is specifically configured to determine the reference time unit.

The third determination module 1405 is specifically configured to determine the reference time according to the determined reference time unit.

The third determination module 1405 is specifically configured to determine the activation time corresponding to the secondary cell to be activated and/or the deactivation time corresponding to the secondary cell to be deactivated according to the determined reference time.

Specifically, the third determination module 1405 is specifically configured to determine an activation reference time corresponding to the secondary cell to be activated, based on received CATI and/or determine the deactivation reference time of the secondary cell to be deactivated through the received high layer signaling.

Specifically, the third determination module 1405 is further specifically configured to determine the activation reference time corresponding to the secondary cell to be activated, based on the number of reference time units carried by the CATI for indicating the difference between the time when the CADI is received and the reference time when the secondary cell is activated and/or deactivated.

Specifically, the third determination module 1405 is further specifically configured to determine the deactivation reference time of the secondary cell to be deactivated based on the number of reference time units carried in the high layer signaling for the difference between the time when the CADI is received and the deactivation reference time of the secondary cell.

In one possible implementation, the duration of the reference time unit includes at least one of the following: a predefined duration value; a time slot length or an OFDM symbol length of a BWP with a largest SCS in the secondary cell to be activated or the secondary cell to be deactivated; a time slot length or an OFDM symbol length of a BWP with the smallest SCS in the secondary cell to be activated or the secondary cell to be deactivated; and a duration value configured by the higher layer signaling.

Specifically, the third determination module 1405 is further specifically configured to take the time when the secondary cell to be activated and/or deactivated overlaps with the reference time as the activation time corresponding to the secondary cell to be activated and/or the deactivation time corresponding to the secondary cell to be deactivated; and take the next time of the time when the secondary cell to be activated and/or deactivated overlaps with the reference time as the activation time corresponding to the secondary cell to be activated and/or the deactivation time corresponding to the secondary cell to be deactivated.

The embodiment of the application provides another UE. Compared with the prior art in which the activation state or deactivation state of a secondary cell is determined through an MAC layer signaling, the embodiments of the present application acquire the SCASI information, and then determines the states corresponding to at least one secondary cell configured or reconfigured by the UE based on the a SCASI information. The states include: an activation state and an inactivation state. That is, the UE determines the time delay of the state corresponding to any secondary cell is shorter than the time delay of determining the activation or deactivation of the secondary cell through the MAC layer signaling according to the SCASI information, so that the time delay of the activation and/or deactivation of the secondary cell may be reduced, the time delay of the UE receiving or transmitting data may be further reduced, and the power consumption of the UE may be reduced.

Embodiment 6

The embodiment of the present invention provides a UE. As shown in FIG. 15, the electronic device 1500 shown in FIG. 15 includes: a processor 1501 and a memory 1503. Wherein, the processor 1501 is connected to the memory 1503, for example, via a bus 1502. Optionally, the electronic equipment 1500 may further include a communication interface 1504 including an antenna. It should be noted that the communication interface 1504 is not limited to one in actual applications, and the structure of the electronic device 1500 is not limited to the embodiments of the present invention.

Wherein, the processor 1501 is applied in the embodiments of the present invention to realize the functions of the acquisition module and the first determination module shown in FIG. 13 or FIG. 14, and the second determination module, the third determination module and the detection module shown in FIG. 14. The communication interface 1504 includes a receiver and a transmitter. The communication interface 1504 is applied to the embodiments of the present invention for signal interaction with other terminal devices or base stations.

The processor 1501 may be a CPU, a general-purpose processor, a DSP, an ASIC, an FPGA or other programmable logic device, a transistor logic device, a hardware component, or any combination thereof. The processor 1501 may implement or execute the various illustrative logical blocks, modules, and circuits described in connection with the disclosure of embodiments of the present invention. The processor 1501 may also be a combination that implements computing functions, such as a combination that includes one or more microprocessors, a combination of DSP and microprocessors, etc.

Bus 1502 may include a path to transfer information between the above components. The bus 1502 may be a PCI bus, an EISA bus, or the like. Bus 1502 may be divided into an address bus, a data bus, a control bus, etc. For ease of representation, only one thick line is used in FIG. 15, but it does not mean only one bus or one type of bus.

The memory 1503 may be ROM or other type of static storage device capable of storing static information and instructions, RAM or other type of dynamic storage device capable of storing information and instructions, EEPROM, CD-ROM or other optical disk storage, optical disk storage (including compact disk, laser disk, optical disk, digital versatile disk, Blu-ray disk, etc.), magnetic disk storage medium or other magnetic storage device, or any other medium capable of carrying or storing desired program codes in the form of instructions or data structures and capable of being accessed by a computer, but is not limited thereto.

The memory 1503 is used for storing application program codes for executing embodiments of the present invention, and is controlled to be executed by the processor 1501. The processor 1501 is used to execute application program codes stored in the memory 1503 to implement operations performed by the modules shown in FIG. 13 or FIG. 14.

The embodiment of the application provides a UE. Compared with the prior art in which the activation state or deactivation state of a secondary cell is determined through an MAC layer signaling, the embodiments of the present application acquire the SCASI information, and then determines the states corresponding to at least one secondary cell configured or reconfigured by the UE based on the a SCASI information. The states include: an activation state and an inactivation state. That is, the UE determines the time delay of the state corresponding to any secondary cell is shorter than the time delay of determining the activation or deactivation of the secondary cell through the MAC layer signaling according to the SCASI information, so that the time delay of the activation and/or deactivation of the secondary cell may be reduced, the time delay of the UE receiving or transmitting data may be further reduced, and the power consumption of the UE may be reduced.

Embodiment 7

FIG. 16 schematically shows a block diagram of a computing system that can be used to implement the UE of the present application according to an embodiment of the present application.

As shown in FIG. 16, the computing system 1100 includes a processor 1610, a computer readable storage medium 1620, an output interface 1630, and an input interface 1640. The computing system 1100 may perform the method described above with reference to FIG. 5 to determine that the state corresponding to at least one secondary cell configured or reconfigured by the UE is an activation state or an inactivation state respectively, and perform corresponding activation and/or deactivation operations.

Specifically, the processor 1610 may include, for example, a general-purpose microprocessor, an instruction set processor and/or a relevant chipset and/or an application specific microprocessor (e.g., an application specific integrated circuit (ASIC)), etc. The processor 1610 may also include an onboard memory for caching purposes. The processor 1610 may be a single processing unit or a plurality of processing units for performing different actions of the method flow described with reference to FIG. 5.

The computer readable storage medium 1620 may be, for example, any medium capable of containing, storing, transferring, propagating, or transmitting instructions. For example, a readable storage medium may include, but is not limited to, an electrical, magnetic, optical, electromagnetic, infrared, or semiconductor system, apparatus, device, or propagation medium. Specific examples of the readable storage media include: a magnetic storage device such as a magnetic tape or a hard disk (HDD); an optical storage device such as a compact discs (CD-ROM); a memory such as a random access memory (RAM) or a flash memory; and/or a wired/wireless communication link.

The computer readable storage medium 1620 may include a computer program, which may include codes/computer executable instructions that, when executed by the processor 1610, cause the processor 1610 to perform, for example, the method flow described above in connection with FIG. 5 and any variations thereof.

The computer program may be configured to have, for example, computer program codes including computer program modules. For example, in an example embodiment, the codes in the computer program may include one or more program modules, including, for example, module 1, module 2, . . . . It should be noted that the division mode and number of modules are not fixed, and those skilled in the art may use appropriate program modules or combination of program modules according to the actual situations. When these combination of program modules are executed by the processor 1610, the processor 1610 may perform, for example, the method flow described above in connection with FIG. 5 and any variations thereof.

According to an embodiment of the present application, the processor 1610 may use the output interface 1630 and the input interface 1640 to perform the method flow described above in connection with FIG. 5 and any variations thereof.

The embodiment of the application provides a computing system. Compared with determining the activation state or deactivation state of a secondary cell through an MAC layer signaling in the prior art, the embodiment of the application obtains secondary cell activation state indicator information, and then determines the respective corresponding states of at least one secondary cell configured or reconfigured by the UE based on the secondary cell activation state indicator information. The states include: an activation state and an inactivation state, and then corresponding activation and/or deactivation operations are performed based on the determined states corresponding to at least one secondary cell configured or reconfigured by the UE, respectively. That is, the UE determines the time delay of the state corresponding to any secondary cell according to the activation state indicator information of the secondary cell, which is shorter than the time delay of determining the activation or deactivation of the secondary cell through the MAC layer signaling, so that the time delay of the activation and/or deactivation of the secondary cell can be reduced, the time delay of the UE receiving or transmitting data can be further reduced, and the power consumption of the UE can be reduced.

It should be understood that although various steps in the flowchart of the drawings are shown in sequence as indicated by arrows, these steps are not necessarily executed in sequence as indicated by arrows. Unless explicitly stated herein, the execution of these steps is not strictly limited in sequence, but may be performed in other sequences. Moreover, at least a part of the steps in the flowchart of the drawings may include a plurality of sub-steps or stages, which are not necessarily completed at the same time, but may be executed at different times, and the execution order thereof is not necessarily sequentially, but may be executed in turn or alternately with at least a part of the sub-steps or stages of other steps or other steps.

The above description is only a partial embodiment of the present invention. It should be pointed out that for a person of ordinary skill in the art, several improvements and embellishments can be made without departing from the principles of the present invention. These improvements and embellishments should also be regarded as the scope of protection of the present invention.

The invention claimed is:

1. A method for operating a user equipment (UE) in a wireless communication system, the method comprising:
    acquiring secondary-cell activation state indicator (SCASI) information from received downlink control information (DCI); and
    determining a state corresponding to at least one secondary cell configured for the UE or reconfigured by the UE based on the SCASI information from the received DCI, wherein the state includes an activation state and an inactivation state,
    wherein the DCI has a plurality of bits indicating the SCASI information, and
    wherein a number of the bits is the same as a number of the at least one secondary cell.

2. The method of claim 1, wherein acquiring SCASI information, comprises at least one of the following:
    acquiring the SCASI information respectively corresponding to respective secondary cells currently in the activation state through a predetermined timer respectively corresponding to respective secondary cells currently in the activation state.

3. The method of claim 2, wherein acquiring the SCASI information from received DCI comprises at least one of the following:
    acquire secondary-cell activation indicator (CAI) information of respective secondary cells corresponding to scheduled PDSCHs from the DCI in a physical downlink control channel (PDCCH) for scheduling a physical downlink shared channel (PDSCH);

acquiring secondary-Cell Deactivation Indicator (CDI) information of respective secondary cells corresponding to scheduled PDSCHs from the DCI in the PDCCH for scheduling the PDSCH;

acquiring secondary-Cell Activation/Deactivation Indicator (CADI) information from the DCI in the PDCCH which is specially used for indicating activation/deactivation of downlink secondary cells.

4. The method of claim 2, wherein acquiring the SCASI information respectively corresponding to respective secondary cells currently in the activation state through a predetermined timer respectively corresponding to respective secondary cells currently in the activation state comprises:

acquiring a predefined current timer value corresponding to the secondary cell currently in the activation state as SCASI information corresponding to the secondary cell currently in the activation state.

5. The method of claim 3, wherein determining a state corresponding to at least one secondary cell configured for the UE or reconfigured by the UE based on the SCASI information, comprises at least one of the following:

determining the state of the secondary cell corresponding to the scheduled PDSCH based on the CAI in the PDCCH for scheduling the PDSCH;

determining the state of the secondary cell corresponding to the scheduled PDSCH based on the CDI in the PDCCH for scheduling the PDSCH;

determining states corresponding to respective secondary cells configured or reconfigured by the UE based on the CADI information in the PDCCH for scheduling the PDSCH; and determining the state corresponding to the secondary cell currently in the activation state based on the predefined current timer value corresponding to the secondary cell currently in the activation state and the predefined timing value.

6. The method of claim 5, wherein determining the state corresponding to the secondary cell currently in the activation state based on the predefined current timer value corresponding to the secondary cell currently in the activation state and the predefined timing value, comprises:

determining that the secondary cell currently in the activation state needs to be converted from the activation state to the inactivation state, if the predefined current timer value corresponding to the secondary cell currently in the activation state is not less than the predefined timing value; and/or determining that the secondary cell currently in the activation state is still in the activation state, if the predefined current timer value corresponding to the secondary cell currently in the activation state is less than the predefined timing value.

7. The method of claim 2, further comprising:

determining the state corresponding to the secondary cell currently in the activation state based on the predefined current timer value corresponding to the secondary cell currently in the activation state and the predefined timing value, if the DCI is not acquired in a predefined time unit.

8. The method of claim 3, wherein after determining a state corresponding to at least one secondary cell configured for the UE or reconfigured by the UE based on the SCASI information, the method further comprises:

detecting a physical downlink control channel (PDCCH) in secondary cell in an activation state.

9. The method of claim 1, further comprising:

determining an activation time corresponding to the secondary cell to be activated and/or a deactivation time corresponding to the secondary cell to be deactivated.

10. The method of claim 9, wherein determining the activation time corresponding to the secondary cell to be activated and/or the deactivation time corresponding to the secondary cell to be deactivated, comprises:

determining a reference time unit;

determining a reference time according to the determined reference time unit; and determining the activation time corresponding to the secondary cell to be activated and/or the deactivation time corresponding to the secondary cell to be deactivated according to the determined reference time.

11. The method of claim 10, wherein determining a reference time according to the determined reference time unit, comprises at least one of the following:

determining an activation reference time corresponding to the secondary cell to be activated, based on received Cell Activation Timing indicator (CATI); and determining the deactivation reference time of the secondary cell to be deactivated through a received high layer signaling.

12. The method of claim 11, wherein determining the activation reference time corresponding to the secondary cell to be activated, based on the received CATI, comprises:

determining the activation reference time corresponding to the secondary cell to be activated, based on the number of reference time units carried by the CATI for indicating the difference between the time when the CADI is received and the reference time when the secondary cell is activated and/or deactivated; and/or determining the deactivation reference time of the secondary cell to be deactivated through the received high layer signaling, comprising:

determining the deactivation reference time of the secondary cell to be deactivated based on the number of reference time units carried in the high layer signaling for the difference between the time when the CADI is received and the deactivation reference time of the secondary cell.

13. The method of claim 10, wherein determining the activation time corresponding to the secondary cell to be activated and/or the deactivation time corresponding to the secondary cell to be deactivated according to the determined reference time, comprises at least one of the following:

taking a first time when the secondary cell to be activated and/or deactivated overlaps with the reference time as the activation time corresponding to the secondary cell to be activated and/or the deactivation time corresponding to the secondary cell to be deactivated; and taking a second next time of the first time when the secondary cell to be activated and/or deactivated overlaps with the reference time as the activation time corresponding to the secondary cell to be activated and/or the deactivation time corresponding to the secondary cell to be deactivated.

14. An apparatus of a user equipment (UE) in a wireless communication system, the apparatus comprising:

a transceiver; and at least one processor coupled to the transceiver and configured to:

acquire secondary-cell activation state indicator (SCASI) information from received downlink control information (DCI); and determine a state corresponding to at least one secondary cell configured for the UE or reconfigured by the UE based on the SCASI information from the received DCI, wherein the state includes an activation state and an inactivation state, wherein the DCI has a plurality of bits indicating the SCASI information, and wherein a number of the bits is the same as a number of the at least one secondary cell.

15. A user equipment (UE) in a wireless communication system, the UE comprising:

a transceiver;

a storage; and at least one processor coupled to the storage and configured to:

store machine-readable instructions that, when executed by the at least one processor, cause the at least one processor to perform a method for determining state of a secondary cell, which comprises:

acquire secondary-cell activation state indicator (SCASI) information from received downlink control information (DCI); and determine a state corresponding to at least one secondary cell configured for the UE or reconfigured by the UE based on the SCASI information from the received DCI, wherein the state includes an activation state and an inactivation state, wherein the DCI has a plurality of bits indicating the SCASI information, and wherein a number of the bits is the same as a number of the at least one secondary cell.

16. The apparatus of claim 14, wherein the at least one processor is further configured to:

acquire the SCASI information respectively corresponding to respective secondary cells currently in the activation state through a predetermined timer respectively corresponding to respective secondary cells currently in the activation state.

17. The apparatus of claim 14, wherein the at least one processor is further configured to:

detecting a physical downlink control channel (PDCCH) in a secondary cell in an activation state after determining the state corresponding to the at least one secondary cell configured or reconfigured by the UE based on the SCASI information.

18. The apparatus of claim 14, wherein the at least one processor is further configured to:

determine an activation time corresponding to the secondary cell to be activated and/or a deactivation time corresponding to the secondary cell to be deactivated.

* * * * *